US012118984B2

(12) United States Patent
Aher et al.

(10) Patent No.: US 12,118,984 B2
(45) Date of Patent: Oct. 15, 2024

(54) SYSTEMS AND METHODS TO RESOLVE CONFLICTS IN CONVERSATIONS

(71) Applicant: Rovi Guides, Inc., San Jose, CA (US)

(72) Inventors: Ankur Anil Aher, Maharashtra (IN); Jeffry Copps Robert Jose, Tamil Nadu (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/095,516

(22) Filed: Nov. 11, 2020

(65) Prior Publication Data

US 2022/0148573 A1 May 12, 2022

(51) Int. Cl.
*G10L 15/08* (2006.01)
*G10L 25/51* (2013.01)

(52) U.S. Cl.
CPC .............. *G10L 15/08* (2013.01); *G10L 25/51* (2013.01)

(58) Field of Classification Search
CPC ................................ G10L 15/08; G10L 25/51
See application file for complete search history.

(56) References Cited

U.S. PATENT DOCUMENTS

| | | | |
|---|---|---|---|
| 5,848,388 A | 12/1998 | Power et al. | |
| 6,549,589 B1 | 4/2003 | Tsuruoka | |
| 7,308,404 B2 | 12/2007 | Venkataraman et al. | |
| 8,525,012 B1 | 9/2013 | Yang | |
| 8,843,372 B1 * | 9/2014 | Isenberg | G10L 17/00 |
| 8,924,211 B2 | 12/2014 | Ganong et al. | |
| 9,585,616 B2 * | 3/2017 | Bowers | G10L 15/00 |
| 9,880,805 B1 | 1/2018 | Guralnick | |
| 9,966,065 B2 * | 5/2018 | Gruber | G10L 15/18 |
| 2001/0039872 A1 | 11/2001 | Cliff | |
| 2002/0037083 A1 | 3/2002 | Weare et al. | |
| 2002/0199186 A1 | 12/2002 | Ali et al. | |
| 2003/0089218 A1 | 5/2003 | Gang et al. | |
| 2003/0159566 A1 | 8/2003 | Sater et al. | |
| 2004/0107821 A1 | 6/2004 | Alcalde et al. | |

(Continued)

OTHER PUBLICATIONS

U.S. Appl. No. 16/528,537, filed Jul. 31, 2019, Siddhartha Pande.

(Continued)

*Primary Examiner* — Richemond Dorvil
*Assistant Examiner* — Ethan Daniel Kim
(74) *Attorney, Agent, or Firm* — Haley Guiliano LLP

(57) ABSTRACT

Systems and methods are presented herein for providing a user with a notification, or access to content, based on the user's factual discourse during a conversation with other users. A first user may provide a first statement. A second user may provide a second statement. An application determines the first and the second statement are associated with first and second user profiles, respectively. The application analyzes the elements of each respective statement and determines there is a conflict between the user statements. In response to determining there is a conflict between the respective statements, the application generates a respective search query to verify each respective statement. When the application determines there is an answer that resolves the conflict between the respective statements, the application generates a notification for the users that comprises the answer that resolves the conflict and may include access to content affirming the answer.

15 Claims, 10 Drawing Sheets

(56) References Cited

U.S. PATENT DOCUMENTS

| | | |
|---|---|---|
| 2005/0144016 A1 | 6/2005 | Hewitt et al. |
| 2006/0031402 A1 | 2/2006 | Saito et al. |
| 2006/0206326 A1 | 9/2006 | Fukada |
| 2007/0255708 A1 | 11/2007 | Morita et al. |
| 2008/0091571 A1 | 4/2008 | Sater et al. |
| 2008/0104061 A1 | 5/2008 | Rezaei |
| 2008/0195654 A1 | 8/2008 | Weare |
| 2009/0013002 A1 | 1/2009 | Eggink et al. |
| 2009/0019995 A1 | 1/2009 | Miyajima |
| 2009/0064851 A1 | 3/2009 | Morris et al. |
| 2009/0107320 A1 | 4/2009 | Willacy et al. |
| 2010/0063952 A1 | 3/2010 | Sassa et al. |
| 2010/0169091 A1 | 7/2010 | Zurek et al. |
| 2010/0305732 A1 | 12/2010 | Serletic |
| 2011/0200116 A1 | 8/2011 | Bloch et al. |
| 2012/0245996 A1 | 9/2012 | Mendez et al. |
| 2013/0340594 A1 | 12/2013 | Uemura et al. |
| 2014/0012575 A1 | 1/2014 | Ganong et al. |
| 2014/0190335 A1 | 7/2014 | Wieder |
| 2014/0195919 A1 | 7/2014 | Wieder |
| 2015/0178391 A1 | 6/2015 | Villaron |
| 2016/0086089 A1 | 3/2016 | Ritchie et al. |
| 2017/0046124 A1 | 2/2017 | Nostrant |
| 2017/0230438 A1 | 8/2017 | Turkoglu |
| 2018/0357220 A1* | 12/2018 | Galitsky ............... G06F 17/27 |
| 2019/0387998 A1 | 12/2019 | Garten et al. |
| 2020/0104943 A1* | 4/2020 | Page-Romer .......... G06Q 50/00 |
| 2020/0177410 A1* | 6/2020 | Iyengar ................. H04L 12/28 |
| 2021/0034661 A1 | 2/2021 | Pande et al. |

OTHER PUBLICATIONS

U.S. Appl. No. 16/171,093, filed Oct. 25, 2018, Murali Aravamudan.

* cited by examiner

SYSTEMS AND METHODS TO RESOLVE CONFLICTS IN CONVERSATIONS

BACKGROUND

The present disclosure is directed to systems and methods for providing a user with information relevant to a conversation, and more particularly, to systems and methods that provide a notification, or access to content, based on the user's factual discourse during a conversation with other users.

SUMMARY

When a plurality of users is consuming content provided by a content platform, a first user may ask a question to another user consuming the content. The other user may respond with conflicting information. In some existing systems, one of the users may need to provide an activation phrase, or wake-up command, to a system to enable a microphone to record the user's inquiry. Additionally, the user may need to formulate a question for the system to execute an appropriate search. This approach is deficient in that the system is unable to assist the users with their conflict until the activation phrase is spoken. Additionally, the system is unable to execute a search without a user-formed question, because it is not capable of anticipating or generating a question on its own.

Other existing systems can analyze a conversation based on naturalness criteria to determine if a request may be imminent. For example, users may be discussing ordering food. The system may identify that multiple users have interest in ordering food, based on the conversation being had, and may start to note similarities between preferences such as type of food. The system may then start to generate recommendations for orders based on the shared interests of the participants having the conversation. This approach is also deficient because the system does not analyze for conflict and may provide recommendations based only on what users continue to discuss. Additionally, the generation of the recommendation may be irrespective of whether users are consuming media content.

These and other deficiencies are solved by the systems and methods described herein, which utilize a conversational conflict resolution application, comprised of input/output circuitry, control circuitry, and algorithms encoded thereon, that receives statements from multiple users that indicate a factual discourse between statements made by different users, then provides a notification that resolves the factual discourse. A plurality of users may be viewing a media asset, such as a movie. For example, the media asset being viewed may be the movie "The Da Vinci Code." A first user may make a statement such as, "I think the director of this movie is Mel Gibson." A second user may make a statement such as, "No, I think the director of this movie is Ron Howard." Multiple users may make statements, and audio signatures may be assigned to each respective user based on audio characteristics of statements made by each respective user. Each of the respective statements may be converted to respective text strings or text files for analysis of the elements of each respective statement. Based on the review of the elements, it may be determined there is a factual discourse by determining that each respective user has provided a different subject associated with each element of each respective statement. In this example, the elements are the director, the movie "The Da Vinci Code," and a respective name provided by each respective user, the names being Mel Gibson and Ron Howard. The extracted elements may then be utilized to perform a search for support for the elements of each respective statement. In performing the search, the system may query one or more servers to which the system is connected by a network. The search results of each statement may then be compared to determine which user created the statement that has the most support. Once the statement with the most support is identified, a notification may be generated for display that identifies the supported statement. Continuing the above example, the notification in response to the discussed discourse may be "The director of The Da Vinci Code is Ron Howard."

In some embodiments, a conversation being held in a chat forum associated with a media asset may be reviewed. A forum post may be generated, and responses to the generated forum post may be reviewed. Past forum post responses may also be reviewed within a predetermined period of time from an initial forum post related to the topic that is the subject of the factual discourse between users.

These techniques solve the problems of other approaches described above. In particular, this approach does not rely on an activation phrase, or wake-up command. Instead, the system continuously monitors of a conversation between users and reviews phrases spoken by respective users to determine if there is a conflict between a first statement by a first user and a second statement by a second user. Thus, the analysis can be performed at any time without the users having to stop a conversation or stop viewing of media content in order to enable the system to review input phrases. Additionally, this approach does not require a phrase to be spoken in a particular structure such as a question, as often may be required by systems that rely on an activation phrase or wake-up command. By continuously monitoring the conversation of users, as opposed to waiting for users to identify the conflict then utter an activation phrase or wake-up command then formulate a question, the system can identify a conflict between phrases spoken by different users in a conversation and can decide to conduct a search to rectify the conflict. The approach also addresses the deficiencies in relying only on naturalness criteria to determine if a request is imminent in that the system relies on inputs from multiple users to determine if an original input needs to be questioned, as opposed to merely relying on a first input to generate an affirmation of the first input as previously described.

In some embodiments, a plurality of users may be identified. For example, audio characteristics of monitored voices may be used to determine a number of voices that are speaking. An audio signature may be generated for each respective user and each respective audio signature assigned to each respective user. A search may be conducted for each statement assigned to each audio signature related to the subject of factual discourse in the conversation. Past searches may also be saved and may be associated with each respective audio signature. Past searches may be utilized to modify a new search conducted in response to statements associated with each audio signature.

In some embodiments, a search for each respective statement for each respective audio signature may be conducted to determine which statement yields the most support in the search results. The amount of support for a particular statement may be based on a threshold. For example, one statement may be supported by at least one more search result than the other statement. Alternatively, or additionally, a period of time may be measured between each search result and the time at which the statement was spoken. The threshold may then be based on how recently a search result was created based on a time stamp associated with the search result. The statement having search results with the most recent time stamps may then be considered as the statement with the most support. As another example, the threshold may be related to the popularity of each search result, whether in a single database or in a plurality of databases, based on information related to the number of times each search result was selected by users on the platform on which the search was conducted. The threshold may also be based on the number of platforms accessible through a wireless network, based on a user profile associated with an audio signature, having search results that collectively support one statement over the other. For example, at least one more platform may have search results supporting the first statement over the second statement. It will be readily understood by a person skilled in the art that the threshold utilized herein may be any other suitable threshold, including any combination of the thresholds described herein, and may be determined based on which platforms a user profile associated with an audio signature has access to through the user equipment.

In some embodiments, it may be determined, based on search results, that neither a first nor a second statement has enough support to determine the veracity of either statement. Thus, no notification is generated. For example, the media asset being viewed may be the movie "The Da Vinci Code." A first user may make a statement such as, "I think the director of this movie is Mel Gibson." A second user may make a statement such as, "No, I think the director of this movie is Steven Spielberg." In this example, a first notification may be generated indicating to the users that a search is being conducted to determine the director of "The Da Vinci Code." The first notification to the users may comprise a statement such as, "Let me look up the director of 'The Da Vinci Code' for you." The search may then be conducted utilizing a single inquiry generated by the system based on the remaining elements of the discourse without the names provided by the respective users. A second notification may then be generated for the users which provides the results of the search, and may comprise a statement such as, "The director of 'The Da Vinci Code' is Ron Howard."

In some embodiments, a notification may be provided by a voice assistant. A setting may be enabled that permits the application to access the speakers of a user equipment device and provide audio notification regarding either a search being conducted, or the results of a search conducted based on a detected factual discourse. The voice assistant may be enabled by settings that determine if notifications are provided by audio outputs or visual text-based notifications to be enabled separately or collectively.

BRIEF DESCRIPTIONS OF THE DRAWINGS

The above and other objects and advantages of the disclosure may be apparent upon consideration of the following detailed description, taken in conjunction with the accompanying drawings, in which.

DETAILED DESCRIPTION

Methods and systems are provided herein for providing a notification, or access to content, based on a user's factual discourse during a discussion with other users.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory (RAM), etc.

Figure 1:
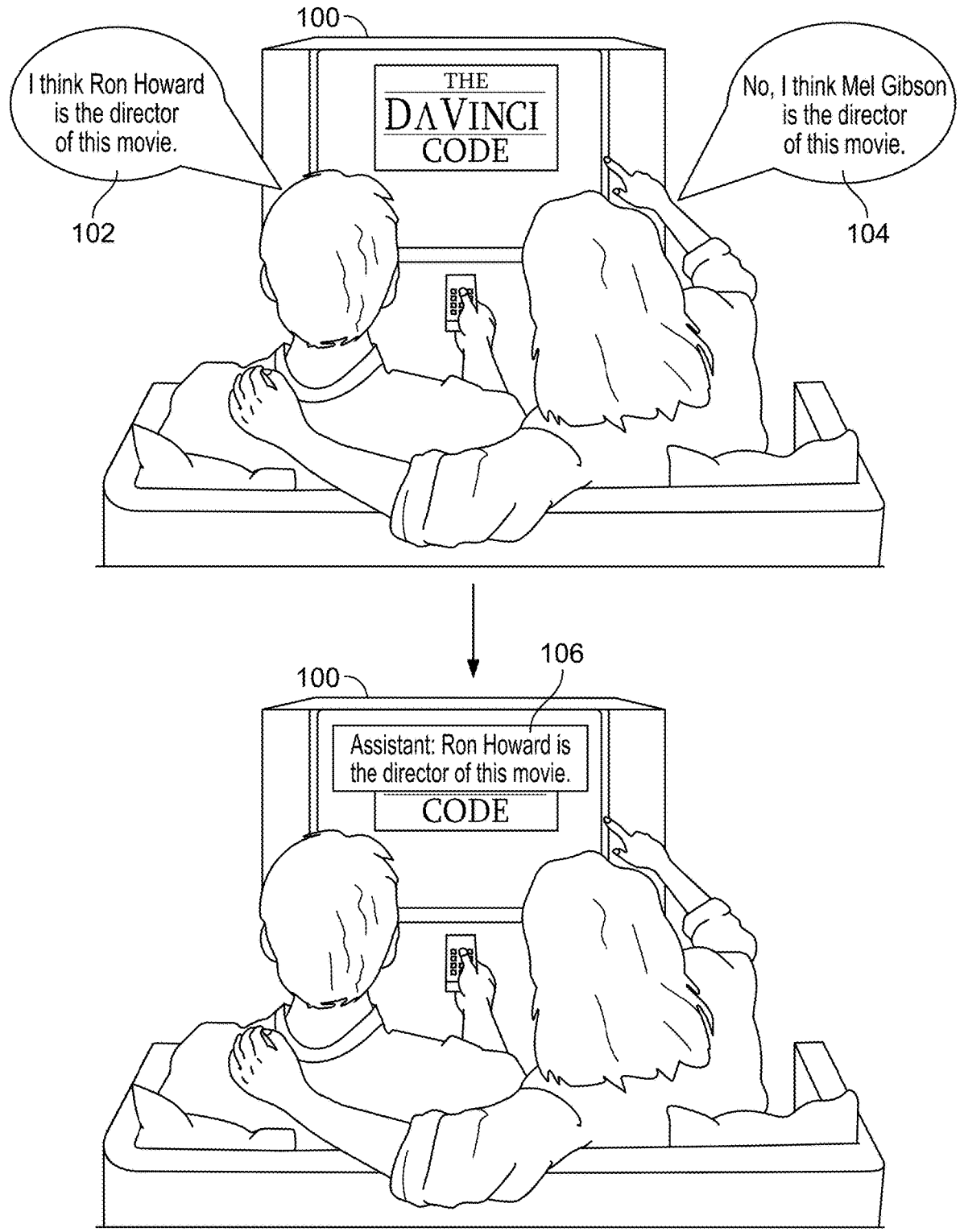
FIG. 1 illustrates an example of an interactive audio/video system for resolving conflicts in conversations, in accordance with some embodiments of the disclosure.

FIG. 1 depicts an example of an interactive audio/video system for resolving conflicts in conversations that may have a conversational conflict resolution application encoded thereon. The interactive audio/video system may include audio outputs, video display, interactive menus, a microphone for recording a user's commands for the system, and a device such as a remote, which would allow the user to input text into a field in an interactive interface to provide a command to the interactive system. In some embodiments, a plurality of users may be consuming a media asset on the video display 100 of the interactive system. In some embodiments, one of the users verbalizes first user statement 102. For example, while watching the movie "The Da Vinci Code," a first user may verbalize a first user statement 102, "I think Ron Howard is the director of this movie." In some embodiments, a second user verbalizes second user statement 104. For example, second user statement 104 may be, "No, I think Mel Gibson is the director of this movie" in response to first user statement 102. The application analyzes first user statement 102 to identify subject matter of first user statement 102. The application also analyzes second user statement 104 to identify subject matter of second user statement 104. The application then compares the subject matter of first user statement 102 and the subject matter of second user statement 104 by comparing respective elements of each respective statement.

In some embodiments, the comparison involves generating a matrix of elements, wherein the application determines if each respective slot in the matrix is filled based on the context of each statement analyzed and the content of each statement analyzed. This is described in further detail below in connection with FIG. 2. In some embodiments, the application determines first user statement 102 and second user statement 104 pertain to the same subject matter and determines at least one material element is not matching between the first user statement and the second user statement. The application may generate a search query using the elements of first user statement 102 and may conduct a first search on any server to which the application can connect using any network to which the interactive system is connected. The application may also generate a search query using the elements of second user statement 104 and may conduct a second search on any server the application can connect to using any network the interactive system is connected to.

Once the first search and the second search are completed, the application performs a comparison of the search results. In some embodiments, the comparison comprises reviewing search results for an affirmation of either first user statement 102 or the second user statement 104. In some embodiments, the comparison comprises comparing the respective search results to a threshold. The amount of support for a particular statement may be based on a threshold. For example, one statement may be supported by at least one more search result than the other statement. Alternatively, or additionally, a period of time may be measured between each search result and the time at which the statement was spoken. The threshold may then be based on how recently a search result was created based on a time stamp associated with the search result. The statement having search results with the most recent time stamps may then be considered as the statement with the most support. As another example, the threshold may be related to the popularity of each search result, whether in a single database or in a plurality of databases, based on information related to the number of times each search result was selected by users on the platform on which the search was conducted. The threshold may also be based on the number of platforms accessible through a wireless network, based on a user profile associated with an audio signature, having search results that collectively support one statement over the other. For example, at least one more platform may have search results supporting the first statement over the second statement. It will be readily understood by a person skilled in the art that the threshold utilized herein may be any other suitable threshold, including any combination of the thresholds described herein, and may be determined based on which platforms a user profile associated with an audio signature has access to through the user equipment.

In some embodiments, the application may determine that either first user statement 102 or second user statement 104 is correct, based on the results of a comparison or search query. For example, the application may determine that Ron Howard is the director of the movie "The Da Vinci Code." In response, the application may generate notification 106 on video display 100 indicating that first user statement 102 is correct. In some embodiments, the notification is an audio notification. The notification may also be generated for display on one or more secondary devices associated with the first user, the second user, or both. For example, the notification may be generated as a push notification to a smartphone of one of the users.

Figure 2:
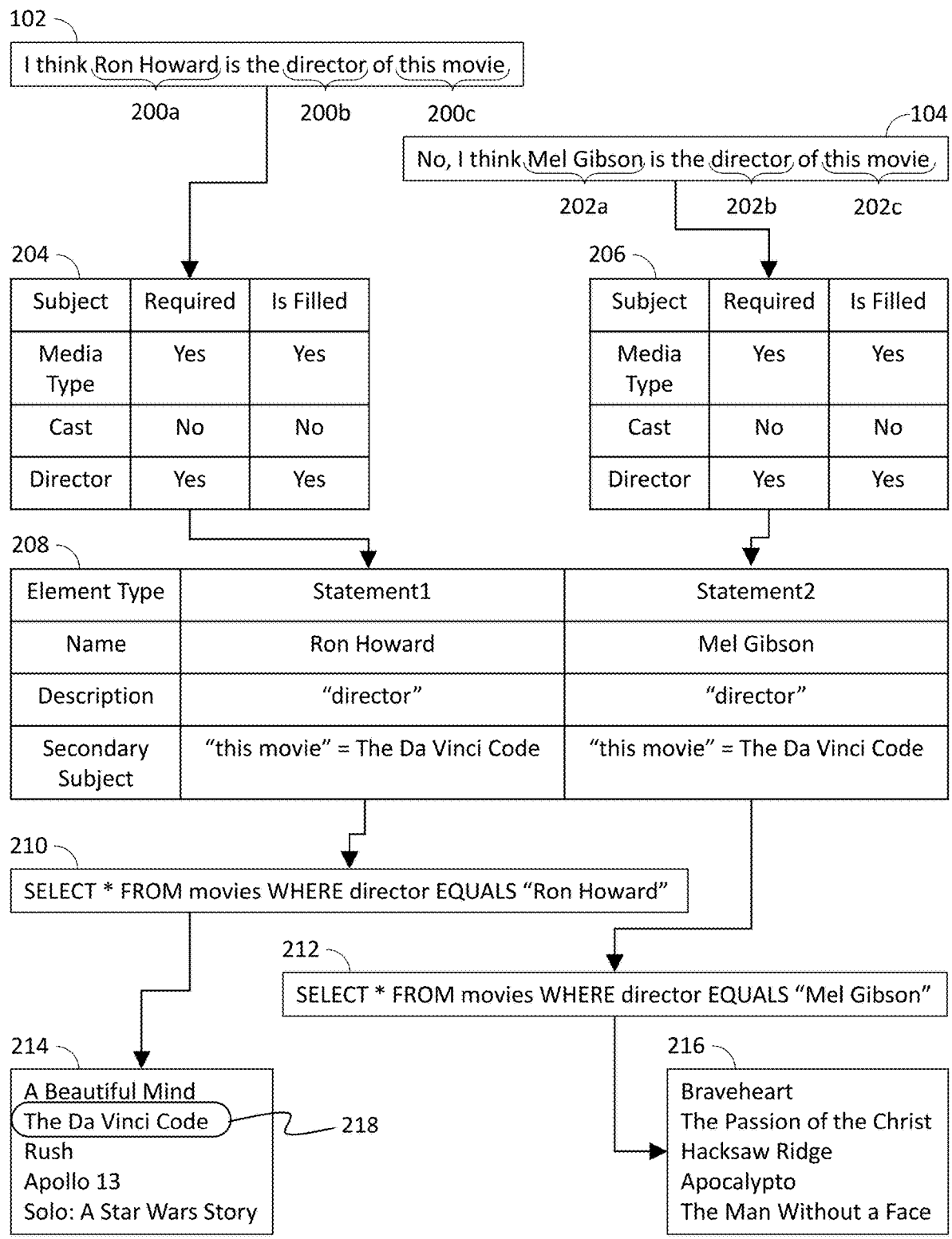
FIG. 2 illustrates an example of analyzing and conducting searches based on statements made by a first user and a second user, in accordance with some embodiments of the disclosure.

FIG. 2 depicts an example pair of search queries generated based on an analysis of first user statement 102 and second user statement 104, which may be executed by the conversational conflict resolution application. The application may receive first user statement 102 and may analyze elements 200a-c of first user statement 102 to identify subject matter of first user statement 102. The application may use first user statement slot matrix 204 to determine present and required elements of first user statement 102. The application may then receive second user statement 104 and may analyze elements 202a-c of second user statement 104 using second user statement slot matrix 206. The application may determine present and required elements of second user statement 104 using elements extracted from first user statement 102 in first user statement slot matrix 204. The application may then perform a comparison using comparison slot matrix 208 of the identified present and required elements of first user statement 102 and second user statement 104. The application may determine that at least one of the identified present and required elements is different between first user statement 102 and second user statement 104. For example, first user statement 102 may name Ron Howard as the director of "The Da Vinci Code" while second user statement 104 may name Mel Gibson as the director of "The Da Vinci Code."

The application may generate first search query 210 based on the extracted elements of first user statement 102 that, when answered affirmatively, would confirm that first user statement 102 is correct. For example, first search query 210 may be an SQL SELECT statement, such as "SELECT * FROM movies WHERE director EQUALS 'Ron Howard'." The application may generate second search query 212 based on the extracted elements of second user statement 104 that, when answered affirmatively, would confirm that second user statement 104 is correct. For example, second search query 212 may be an SQL SELECT statement, such as "SELECT*FROM movies WHERE director EQUALS 'Mel Gibson'." The application may review the results of each respective search query (e.g. first result pool 214 and second result pool 216) and may find search result 218, which confirms one of the user statements is correct. Search result 218 may be utilized by the application to generate a notification, which may comprise a text providing elements 200a-c from first user statement 102, which was confirmed to be correct by search result 218, and may also comprise an audio statement and a link to provide a user access to information related to the search result 218.

In some embodiments, the application may utilize a suitable intent analyzer to determinate the intent of statements 102 and 104. The intent analyzer may be capable of determining the context of a statement and is capable of determining content related to the elements of the users respective statements. In some embodiments, the application may also use a suitable question generator to generate search queries 210 and 212 based on the determined intent.

For example, the application may utilize HuggingFace's Transformers library of algorithms to determine intent and/ or to generate questions based on the determined intent. HuggingFace's Transformers library is described, for example, in Thomas Wolf et al., Transformers: State-of-the-Art Natural Language Processing, Cornell University Archive, Jul. 14, 2020, at 1-8), which is hereby incorporated by reference herein in its entirety.

In another example, multiple users may be present in the vicinity of the interactive system. For example, the multiple users may be engaged in conversation related to what media content is on video display 100. In some embodiments, the application is configured to identify a plurality of users who are speaking. The application may record statements from each user and assign a respective audio signature based on the recorded statements to each respective user. The application may use these recordings to generate respective user profiles based on each respective audio signature. In some embodiments, the user profile keeps a record of past search queries generated for statements issued by each respective audio signature. The application may use the data associated with each respective audio signature as an input to the intent analyzer to initiate a search sooner or to predict an upcoming factual discourse between users, based on the searches generated in relation to their respective audio signatures. In some embodiments, the application generates a first notification to the plurality of users that a search may be conducted before generating a notification that comprises a result of a search.

The application is capable of generating the question through a variety of methods. For example, the application includes a user intent analyzer, which is able to process statements that are input into the interactive system. The intent analyzer utilized herein is analogous to the intent analyzer described in U.S. patent application Ser. No. 16/171,093 to Murali Aravamudan et al., and is comparable to the recommendation engine of U.S. patent application Ser. No. 16/528,537 to Siddartha Pande et al., both of which are hereby incorporated by reference herein in their entireties. The intent analyzer is able to parse a user's statement into a relevant noun and a relevant verb. The intent analyzer additionally has a stored library of context indicators to assist in the generation of an appropriate search query that, when answered, confirms the user's statement is request. In another example, the application is able to convert the user's input statement into a Boolean yes/no question by rearranging a significant noun and a significant verb. In another example, the application utilizes the HuggingFace's Transformers library of algorithms to rearrange the elements of a user's input to create a question that, when answered affirmatively, can confirm that the condition of the user's request is met.

Figure 3:
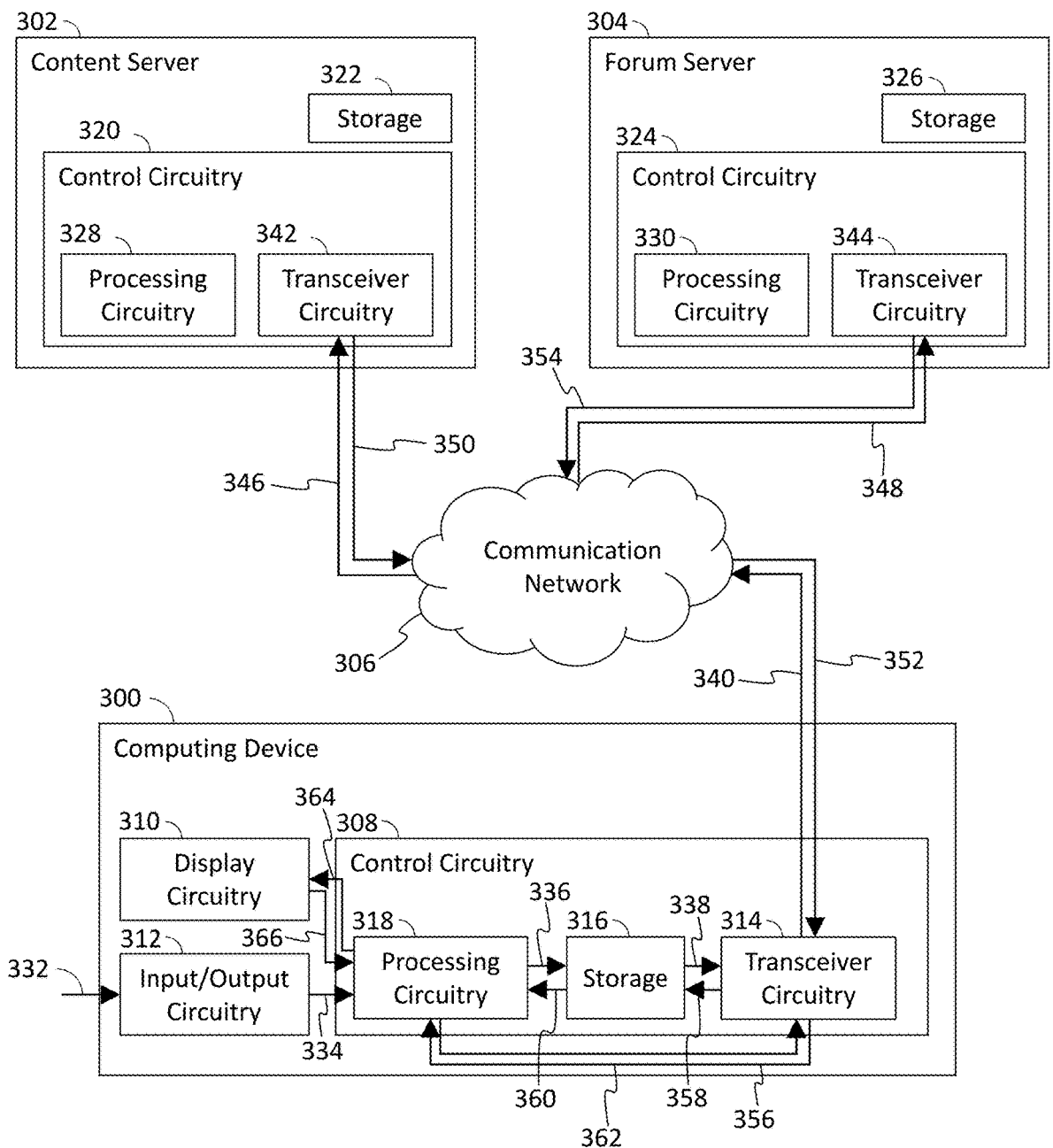
FIG. 3 is a block diagram representing devices, components of each device, and data flow therebetween for an interactive audio/video system for resolving conflicts in conversations incorporating user statement processing features, in accordance with some embodiments of the disclosure.

In some embodiments, the application is capable of accessing content server 302 and forum server 304, e.g., as shown in FIG. 3. The application is capable of utilizing the processing of multiple modules connected by communication network 306 to find and review the information available on content server 302 and forum posts available on forum server 304. The application may be capable of utilizing the intent analyzer, which was used to generate the initial question, to process posts made by other users of the network forum subsequent to the generated question to determine if a post incorporates information that does not directly answer the generated question and contains information that is related to the elements of the generated question. The application may also be capable of analyzing the intent behind search queries in a search query database found through content server 302 to formulate related queries to resolve anticipated factual discourses between users.

FIG. 3 is an illustrative block diagram showing an interactive audio/video system for resolving conflicts in conversations incorporating features to enable the conversational conflict resolution application to provide a user with a notification that addresses a factual discourse between users, in accordance with some embodiments of the disclosure. In some embodiments, one or more parts of or the entirety of the interactive system may be configured as a system implementing various features, processes, and components of FIGS. 1, 2, and 4-10. Although FIG. 3 shows a certain number of components, in various examples, the interactive system may include fewer than the illustrated number of components and/or multiples of one or more of the illustrated number of components.

The interactive system is shown to include computing device 300, content server 302, forum server 304, and a communication network 306. It is understood that while a single instance of a component may be shown and described relative to FIG. 3, additional instances of the component may be employed. For example, content server 302 and forum server 304 may include, or may be incorporated in, more than one server. Similarly, communication network 306 may include, or may be incorporated in, more than one communication network. Content server 302 and forum server 304 are each shown communicatively coupled to computing device 300 through communication network 306. While not shown in FIG. 3, content server 302 or forum server 304 may be directly communicatively coupled to computing device 300 or to each other, for example, in a system absent or bypassing communication network 306.

Communication network 306 may comprise one or more network systems, such as, without limitation, Internet, LAN, WiFi or other network systems suitable for audio processing applications. In some embodiments, the system of FIG. 3 excludes content server 302 or forum server 304, and functionality that would otherwise be implemented by content server 302 or forum server 304 is instead implemented by other components of the system depicted by FIG. 3, such as one or more components of communication network 306. In still other embodiments, content server 302 and forum server 304 work in conjunction with one or more components of communication network 306 to implement certain functionality described herein in a distributed or cooperative manner. Similarly, in some embodiments, the system depicted by FIG. 3 excludes computing device 300, and functionality that would otherwise be implemented by computing device 300 is instead implemented by other components of the system depicted by FIG. 3, such as one or more components of communication network 306, content server 302 or forum server 304 or a combination of the same. In other embodiments, computing device 300 works in conjunction with one or more components of communication network 306 or content server 302 or forum server 304 to implement certain functionality described herein in a distributed or cooperative manner.

Computing device 300 includes control circuitry 308, display circuitry 310 and input/output circuitry 312. Control circuitry 308 may be based on any suitable processing circuitry and comprises control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). Some control circuits may be implemented in hardware, firmware, or software. Control circuitry 308 in turn includes transceiver circuitry 314, storage 316 and processing circuitry 318. In some embodiments, computing device 300 or control circuitry 308 may be configured as varying embodiments of audio/visual interactive system device 100 of FIG. 1.

In addition to control circuitry 308, 320, and 324, computing device 300, content server 302, and forum server 304 may each include storage (storage 316, storage 322, and storage 326, respectively). Each of storages 316, 322, and 326 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each storage 316, 322, 326 may be used to store various types of content, metadata, and/or other types of data (e.g., they can be used to record audio questions asked by one or more participants connected to a conference). Non-volatile memory may also be used (e.g., to launch a boot-up routine and other instructions). Cloud-based storage may be used to supplement storages 316, 322, 326 or instead of storages 316, 322, 326. In some embodiments, the audio portion of a conference between multiple participants may be recorded and stored in one or more of storages 316, 322, and 326.

Forum server 304 includes control circuitry 324 and storage 326. Each of storages 316 and 326 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each storage 326, 316 may be used to store various types of content, metadata, and/or other types of data (e.g., they can be used to record audio questions asked by one or more participants connected to a conference). Non-volatile memory may also be used (e.g., to launch a boot-up routine and other instructions). Cloud-based storage may be used to supplement storages 316, 322, 326 or instead of storages 316, 322, 326. In some embodiments, the audio portion of a conference with multiple participants may be recorded and stored in one or more of storages 316, 322, 326.

In some embodiments, control circuitry 320 and/or 308 executes instructions for an application stored in memory (e.g., storage 322 and/or storage 316). Specifically, control circuitry 320 and/or 308 may be instructed by the application to perform the functions discussed herein. In some implementations, any action performed by control circuitry 320 and/or 308 may be based on instructions received from the application. For example, the application may be implemented as software or a set of executable instructions that may be stored in storage 322 and/or 316 and executed by control circuitry 320 and/or 308. In some embodiments, the application may be a client/server application where only a client application resides on computing device 300, and a server application resides on content server 302.

In some embodiments, control circuitry 324 and/or 308 executes instructions for the application stored in memory (e.g., storage 326 and/or storage 316). Specifically, control circuitry 324 and/or 308 may be instructed by the application to perform the functions discussed herein. In some implementations, any action performed by control circuitry 324 and/or 308 may be based on instructions received from the application. For example, the application may be implemented as software or a set of executable instructions that may be stored in storage 326 and/or 316 and executed by control circuitry 324 and/or 308. In some embodiments, the application may be a client/server application where only a client application resides on computing device 300, and a server application resides on forum server 304.

The application may be implemented using any suitable architecture. For example, it may be a stand-alone application wholly implemented on computing device 300. In such an approach, instructions for the application are stored locally (e.g., in storage 316), and data for use by the application is downloaded on a periodic basis (e.g., from an out-of-band feed, from an Internet resource, or using another suitable approach). Control circuitry 308 may retrieve instructions for the application from storage 316 and process the instructions to perform the functionality described herein. Based on the processed instructions, control circuitry 308 may determine a type of action to perform in response to input received from input/output circuitry 312 or from communication network 306. For example, in response to a user providing a statement as part of a conversation with a plurality of users, control circuitry 308 may perform the steps of process 400 (FIG. 4), process 500 (FIG. 5), process 600 (FIG. 6), process 700 (FIG. 7), process 800 (FIG. 8), process 900 (FIG. 9), process 1000 (FIG. 10), or processes relative to various embodiments.

In client/server-based embodiments, control circuitry 308 may include communication circuitry suitable for communicating with an application server (e.g., content server 302) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 306). In another example of a client/server based application, control circuitry 308 runs a web browser that interprets web pages provided by a remote server (e.g., content server 302). For example, the remote server may store the instructions for the application in a storage device. The remote server may process the stored instructions using circuitry (e.g., control circuitry 308) and/or generate displays. Computing device 300 may receive the displays generated by the remote server and may display the content of the displays locally via display circuitry 310. This way, the processing of the instructions is performed remotely (e.g., by content server 302) while the resulting displays, such as the display windows described elsewhere herein, are provided locally on computing device 300. Computing device 300 may receive inputs from the user via input/output circuitry 312 and transmit those inputs to the remote server for processing and generating the corresponding displays. Alternatively, computing device 300 may receive inputs from the user via input/output circuitry 312 and process and display the received inputs locally, by control circuitry 308 and display circuitry 310, respectively.

Content server 302 and computing device 300 may transmit and receive content and data such as media content via communication network 306. For example, content server 302 may be a media content provider, and computing device 300 may be a smart television configured to download or stream media content, such as a live news broadcast, from content server 302. Control circuitry 320, 308 may send and receive commands, requests, and other suitable data through communication network 306 using transceiver circuitry 342, 314, respectively. Alternatively, control circuitry 320, 308 may communicate directly with each other using transceiver circuitry 342, 314, respectively, avoiding communication network 306.

Forum server 304 and computing device 300 may transmit and receive content and data such as media content via communication network 306. For example, forum server 304 may be the network forum associated with a live media content stream available on content server 302, and computing device 300 may be a smart television configured to download or stream media content, such as a Ron Howard movie, from content server 302. Control circuitry 324, 308 may send and receive commands, requests, and other suitable data through communication network 306 using transceiver circuitry 344, 344, respectively. Alternatively, control circuitry 324, 308 may communicate directly with each other using transceiver circuitry 344, 344, respectively, avoiding communication network 306.

It is understood that computing device 300 is not limited to the embodiments and methods shown and described herein. In nonlimiting examples, computing device 300 may be a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other device, computing equipment, or wireless device, and/or combination of the same capable of suitably displaying and manipulating media content.

Computing device 300 receives user input 332 at input/output circuitry 312. For example, computing device 300 may receive a user input such as a user swipe or user touch. In some embodiments, computing device 300 is a media device (or player) configured as device 100, with the capability to access media content. It is understood that computing device 300 is not limited to the embodiments and methods shown and described herein. In nonlimiting examples, computing device 300 may be a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other television equipment, computing equipment, or wireless device, and/or combination of the same.

User input 332 may be received from a user selection-capturing interface that is separate from device 302, such as a remote-control device, trackpad or any other suitable user movement-sensitive or capture devices, or as part of device 302, such as a touchscreen of display circuitry 310. Transmission of user input 332 to computing device 300 may be accomplished using a wired connection, such as an audio cable, USB cable, ethernet cable or the like attached to a corresponding input port at a local device, or may be accomplished using a wireless connection, such as Bluetooth, WiFi, WiMAX, GSM, UTMS, CDMA, TDMA, 3G, 4G, 4G LTE, 5G, or any other suitable wireless transmission protocol. Input/output circuitry 312 may comprise a physical input port such as a 3.5 mm audio jack, RCA audio jack, USB port, ethernet port, or any other suitable connection for receiving audio over a wired connection, or may comprise a wireless receiver configured to receive data via Bluetooth, Wifi, WiMAX, GSM, UTMS, CDMA, TDMA, 3G, 4G, 4G LTE, 5G, or other wireless transmission protocols.

Processing circuitry 318 may receive user input 332 from input/output circuitry 312 using communication path 334. Processing circuitry 318 may convert or translate the received user input 332 that may be in the form of gestures or movement to digital signals. In some embodiments, input/output circuitry 312 performs the translation to digital signals. In some embodiments, processing circuitry 318 (or processing circuitry 328, as the case may be) carries out disclosed processes and methods. For example, processing circuitry 318 or processing circuitry 328 may perform processes 100, 200, and 400-1000, of FIGS. 1, 2, and 4-10, respectively.

Processing circuitry 318 may provide requests to storage 316 by communication path 336. Storage 316 may provide requested information to processing circuitry 318 by communication path 360. Storage 316 may transfer a request for information to transceiver circuitry 314 which may translate or encode the request for information to a format receivable by communication network 306 before transferring the request for information by communication path 338. Communication network 306 may forward the translated or encoded request for information to transceiver circuitry 342 or transceiver circuitry 344, or both, by communication paths 346 and 348, respectively.

At transceiver circuitry 342, the translated or encoded request for information, received through communication path 346, is translated or decoded for processing circuitry 328, which will provide a response to the request for information based on information available through control circuitry 320 or storage 322, or a combination thereof. The response to the request for information is then provided back to communication network 306 by communication path 350 in an encoded or translated format such that communication network 306 can forward the encoded or translated response back to transceiver circuitry 314 by communication path 352.

At transceiver circuitry 344, the translated or encoded request for information, received through communication path 348, is translated or decoded for processing circuitry 330 which will provide a response to the request for information based on information available through control circuitry 324 or storage 326, or a combination thereof. The response to the request for information is then provided back to communication network 306 by communication path 354 in an encoded or translated format such that communication network 306 can forward the encoded or translated response back to transceiver circuitry 314 by communication path 352.

At transceiver circuitry 314, the encoded or translated response to the request for information may be provided directly back to processing circuitry 318 by communication path 356, or may be provided to storage 316 through communication path 358, which then provides the information to processing circuitry 318 by communication path 360. Processing circuitry 318 may also provide a request for information directly to transceiver circuitry 314 though communication path 362, where storage 316 responds to an information request, provided through communication 336, by communication path 360 that storage 316 does not contain information pertaining to the request from processing circuitry 318.

Processing circuitry 318 may process the response to the request received through communication paths 356 or 360 and may provide instructions to display circuitry 310 for a notification to be provided to the users through communication path 364. Display circuitry 310 may incorporate a timer for providing the notification or may rely on inputs through input/output circuitry 312 from the user, which are forwarded through processing circuitry 318 through communication path 364, to determine how long or in what format to provide the notification. When display circuitry 310 determines the display has been completed, a notification may be provided to processing circuitry 318 through communication path 366.

The communication paths provided in FIG. 3 between computing device 300, content server 302, forum server 304, communication network 306, and all subcomponents depicted are exemplary and may be modified to reduce processing time or enhance processing capabilities for each step in the processes disclosed herein by one skilled in the art.

Figure 4:
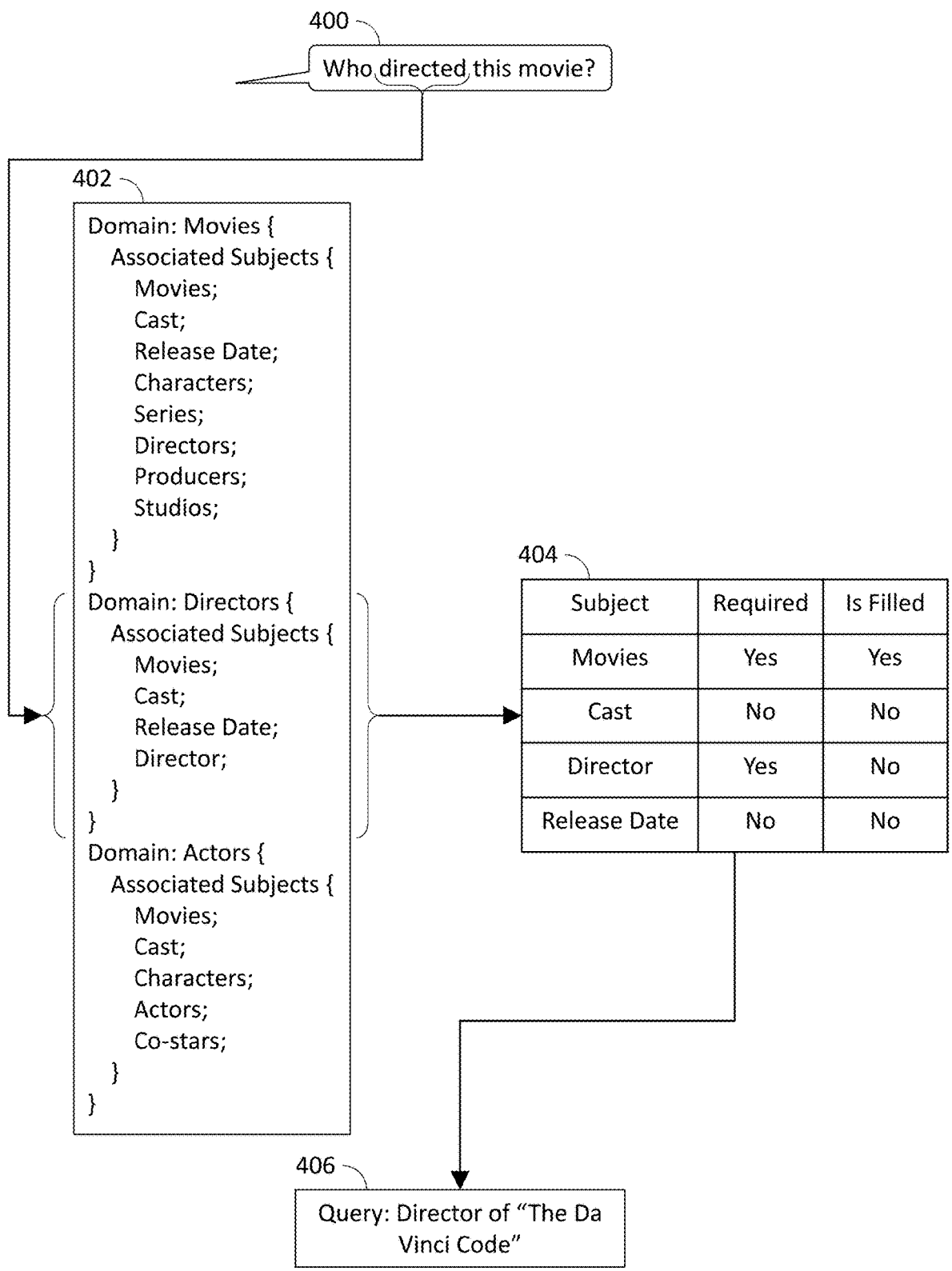
FIG. 4 illustrates an example slot matrix generated in response to a first user statement, in accordance with disclosed methods and embodiments.

FIG. 4 illustrates an example slot matrix generated in response to first user statement 400. In some embodiments, the application may utilize a slot matrix for determining elements of a user statement. For example, user statement 400 may be a user inquiry which is associated with a user profile (e.g., first user). In some embodiments, each statement may be analyzed for determining an audio signature associated with each speaker. In some embodiments, the application associates a user profile with each audio signature. In some embodiments, each search query generated as a result of each user statement that is determined to be in conflict with another user statement is logged and may be made available to the intent analyzer within the application for anticipating a conflict in a conversation.

It should be noted that the process depicted in FIG. 4 or any step thereof could be performed on, or provided by, any device shown in FIG. 3 and can incorporate various user interfaces (e.g., display circuitry 310 of FIG. 3). For example, the process depicted in FIG. 4 may be executed by control circuitry 308 (FIG. 3) of the user equipment exemplified by computing device 302. In addition, one or more steps of the process depicted in FIG. 4 may be incorporated into or combined with one or more steps of any other process or embodiment (e.g., starting at process block 712 in process 700 of FIG. 7, starting at process block 802 in process 800 of FIG. 8, starting at process block 902 in process 900 of FIG. 9, starting at process block 1002 in process 1000 of FIG. 10). In addition, FIG. 1 and FIG. 2 provide depictions of exemplary embodiments of the processes described herein.

The application may analyze user statement 400 to determine domain 402 associated with user statement 400. The application may use domain 402 to generate a list of associated subjects. The application may use the list of associated subjects to generate slot matrix 404 for analyzing subsequent user statements for conflicts. Slot matrix 404 may incorporate for each respective associated subject from the list of associated subjects 404 a "Required" slot and an "Is Filled" slot. A "Required" slot is associated with subjects that a subsequent statement may relate to in order to be considered by the application for analysis for a conflict. An "Is Filled" slot is associated with subjects that are elements of a statement made by a user. When a "Required" slot and an "Is Filled" slot are both filled based on the elements of a user statement, the application may analyze subsequent statements with both of the same slots filled for conflicts. When a "Required" slot is filled and an "Is Filled" slot is not filled, the application may analyze subsequent statements for elements that are related to the slot that is not filled. The application may generate initial query 406 (e.g. "Director of 'The Da Vinci Code'") related to the filled "Required" slots in anticipation of subsequent statements being in conflict.

Figure 5:
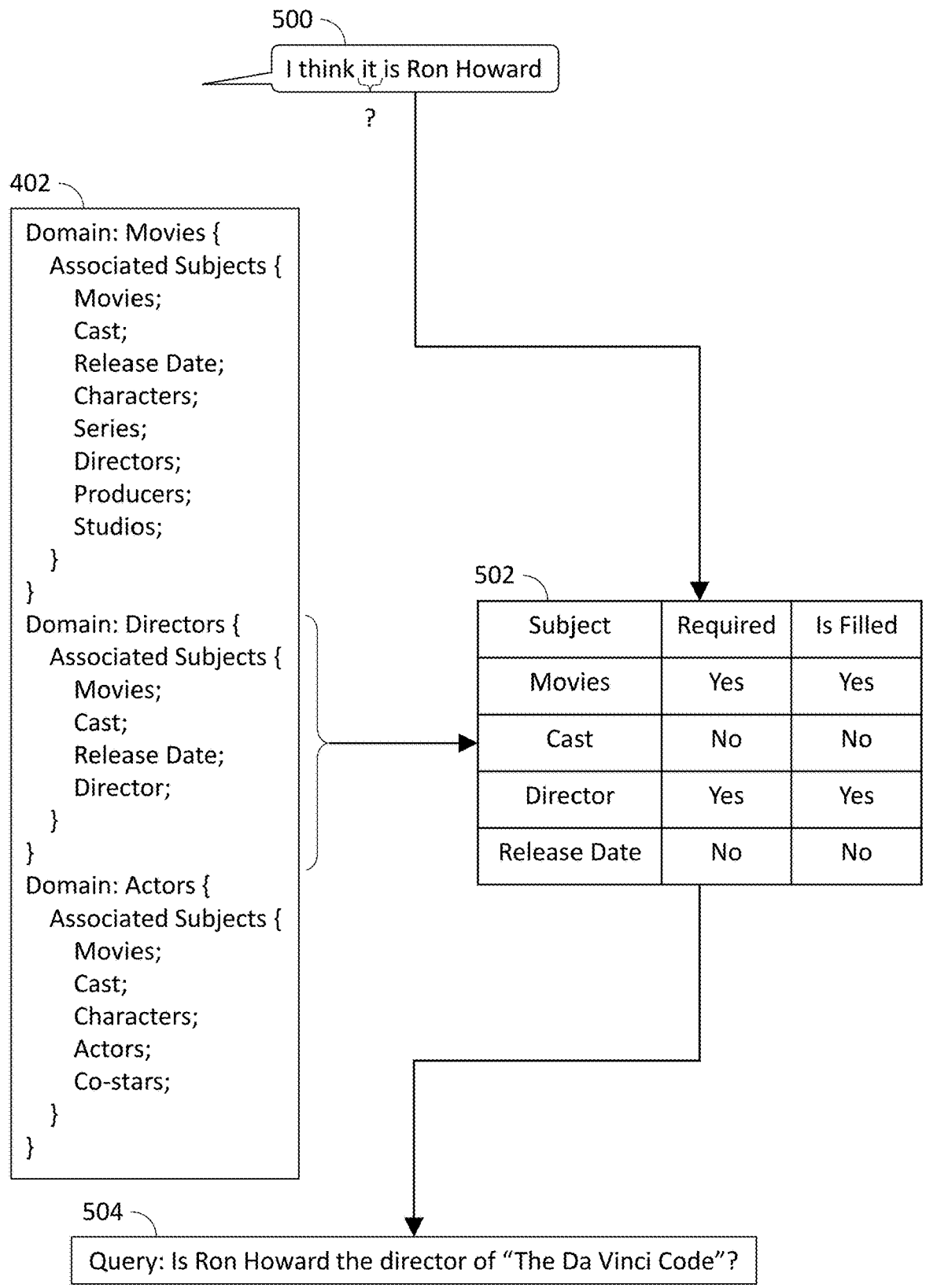
FIG. 5 illustrates an example of determining a second user statement is related to a first user statement, and depicts a slot matrix generated in response to a second user statement that is related to a first user statement, in accordance with some disclosed methods and embodiments.

FIG. 5 illustrates an example of determining whether second user statement 500 is related to user statement 400, and depicts a slot matrix generated in response to second user statement 500 which is related to a first user statement depicted in FIG. 5. For example, user statement 500 may be a user response that is associated with a user profile (e.g., second user). In some embodiments, each statement may be analyzed for determining an audio signature associated with each speaker. In some embodiments, the application associates a user profile with each audio signature. In some embodiments, each search query generated as a result of each user statement that is determined to be in conflict with another user statement is logged and may be made available to the intent analyzer within the application for anticipating a conflict in a conversation.

It should be noted that the process depicted in FIG. 5 or any step thereof could be performed on, or provided by, any device shown in FIG. 3 and can incorporate various user interfaces (e.g., display circuitry 310 of FIG. 3). For example, the process depicted in FIG. 5 may be executed by control circuitry 308 (FIG. 3) of user equipment exemplified by computing device 300. In addition, one or more steps of the process depicted in FIG. 5 may be incorporated into or combined with one or more steps of any other process or embodiment (e.g., starting at process block 712 in process 700 of FIG. 7, starting at process block 802 in process 800 of FIG. 8, starting at process block 902 in process 900 of FIG. 9, starting at process block 1002 in process 1000 of FIG. 10). In addition, FIG. 1 and FIG. 2 provide depictions of exemplary embodiments of the processes described herein.

The application may analyze second user statement 500 to determine a domain associated with second user statement 500. The application may use domain 402 to generate a list of associated subjects. The application may use the list of associated subjects to generate slot matrix 502 for analyzing subsequent user statements for conflicts. Slot matrix 502 may incorporate, for each respective associated subject from the list of associated subjects, a "Required" slot and an "Is Filled" slot. A "Required" slot is associated with subjects that a subsequent statement may relate to in order to be considered by the application for analysis for a conflict. An "Is Filled" slot is associated with subjects that are elements of a statement made by a user. When a "Required" slot and an "Is Filled" slot are both filled based on the elements of a user statement, the application may analyze subsequent statements with both of the same slots filled for conflicts. When a "Required" slot is filled and an "Is Filled" slot is not filled, the application may analyze subsequent statements for elements that are related to the slot that is not filled. For example, second user statement 500 may be, "I think it is Ron Howard." The application may not detect a domain from the statement and may associate the last detected domain (e.g., domain 402 from FIG. 4) with second user statement 500. The application may determine "Ryan Howard" is a director name and may populate slot matrix 502 with a filled "Required" slot and a filled "Is Filled" slot. The application may generate first search query 504 related to the filled "Required" slots (e.g., "Is Ron Howard the director of 'The Da Vinci Code'?") in anticipation of subsequent statements being in conflict and to determine if second user statement 500 is in conflict with the results of the initial search query.

Figure 6:
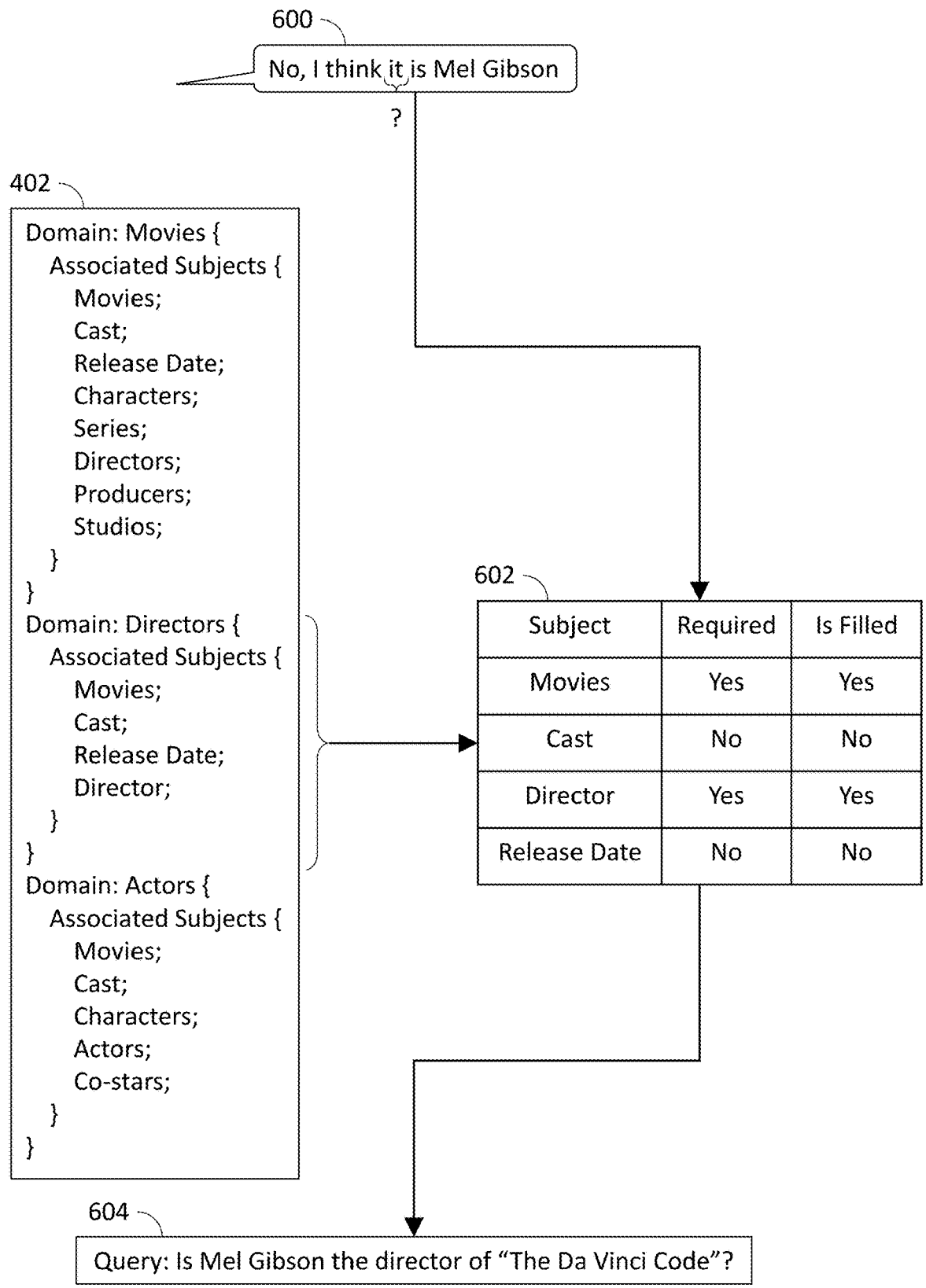
FIG. 6 illustrates an example of determining a third user statement is related to a first and a second user statement, and depicts a slot matrix generated in response to a third user statement that is related to a first and a second user statement, in accordance with some disclosed methods and embodiments.

FIG. 6 illustrates an example of determining whether third user statement 600 is related to user statement 400 from FIG. 4 and second user statement 500 from FIG. 5, and depicts a slot matrix generated in response to third user statement 600, which is related to user statement 400 from FIG. 4 and second user statement 500 from FIG. 5 as depicted in FIG. 6. For example, third user statement 600 may be a first user rebuttal, which is associated with a user profile (e.g., first user). In some embodiments, each statement may be analyzed for determining an audio signature associated with each speaker. In some embodiments, the application associates a user profile with each audio signature. In some embodiments, each search query generated as a result of each user statement that is determined to be in conflict with another user statement is logged and may be made available to the intent analyzer within the application for anticipating a conflict in a conversation.

It should be noted that the process depicted in FIG. 6 or any step thereof could be performed on, or provided by, any device shown in FIG. 3 and can incorporate various user interfaces (e.g., display circuitry 310 of FIG. 3). For example, the process 600 depicted in FIG. 6 may be executed by control circuitry 308 (FIG. 3) of user equipment exemplified by computing device 300. In addition, one or more steps of the process depicted in FIG. 6 may be incorporated into or combined with one or more steps of any other process or embodiment (e.g., starting at process block 712 in process 700 of FIG. 7, starting at process block 802 in process 800 of FIG. 8, starting at process block 902 in process 900 of FIG. 9, starting at process block 1002 in process 1000 of FIG. 10). In addition, FIG. 1 and FIG. 2 provide depictions of exemplary embodiments of the processes described herein.

The application may analyze third user statement 600 to determine a domain associated with third user statement 600. The application may use domain 402 from FIG. 4 to generate a list of associated subjects. The application may use the list of associated subjects to generate slot matrix 602 for analyzing subsequent user statements for conflicts. Slot matrix 602 may incorporate for each respective associated subject from the list of associated subjects a "Required" slot and an "Is Filled" slot. A "Required" slot is associated with subjects that a subsequent statement may relate to in order to be considered by the application for analysis for a conflict.

An "Is Filled" slot is associated with subjects that are elements of a statement made by a user. When a "Required" slot and an "Is Filled" slot are both filled based on the elements of a user statement, the application may analyze subsequent statements with both of the same slots filled for conflicts. When a "Required" slot is filled and an "Is Filled" slot is not filled, the application may analyze subsequent statements for elements that are related to the not filled slot. For example, third user statement 600 may be, "No, I think it is Mel Gibson." The application may not determine a domain from the statement and may associate the last detected domain (e.g., domain 404 from FIG. 4) with third user statement 600. The application may determine "Mel Gibson" is a director name and may populate slot matrix 602 with a filled "Required" slot and a filled "Is Filled" slot. The application may generate second search query 604 related to the filled "Required" slots and filled "Is Filled" slots (e.g., Is Mel Gibson the director of "The Da Vinci Code") which provides a different director name for the same movie as compared to slot matrix 502 from FIG. 5.

Figure 7:
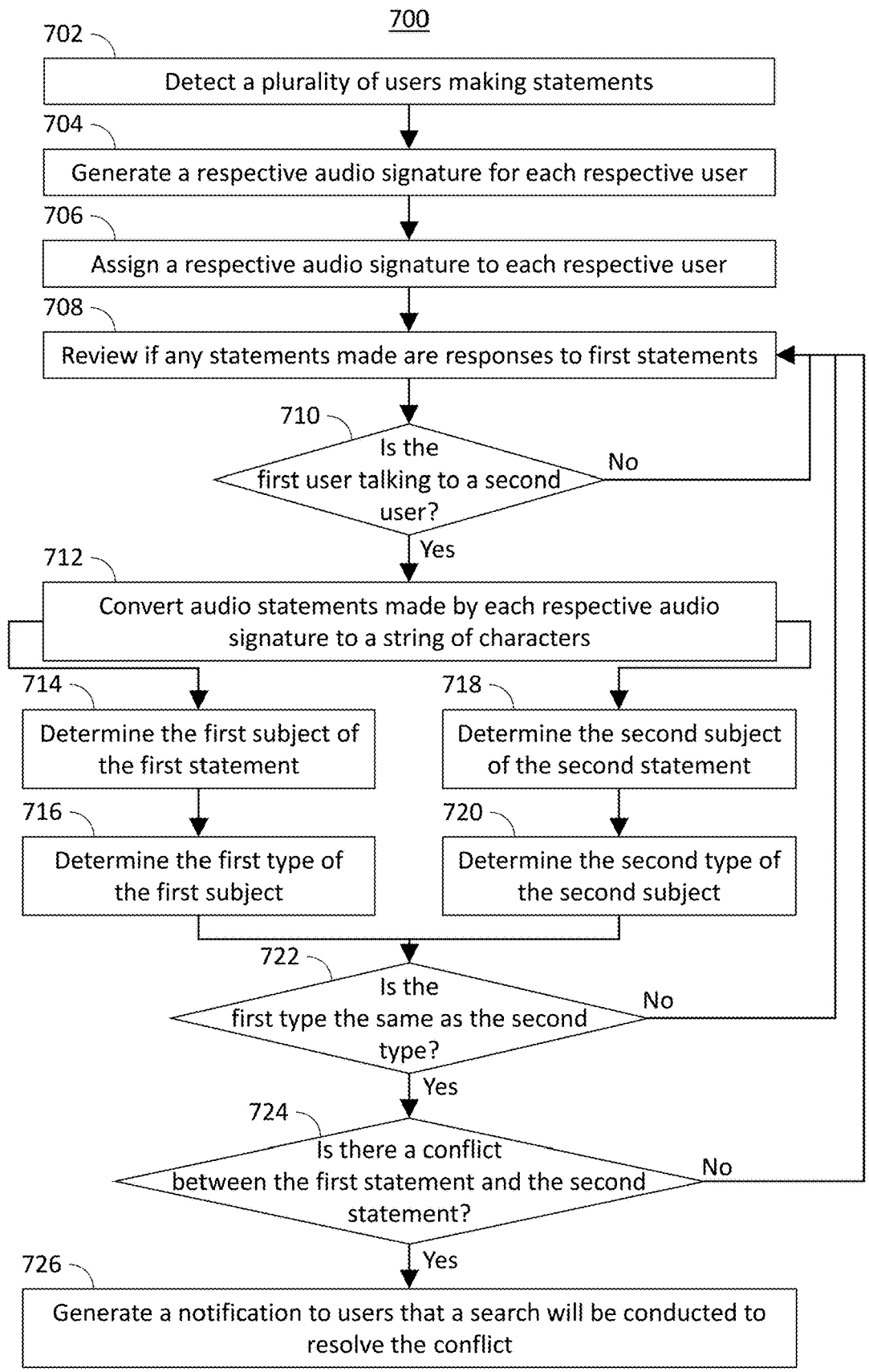
FIG. 7 is a flow chart representing an illustrative process for determining there is a conflict between a first statement by a first user and a second statement by a second user, in accordance with some disclosed methods and embodiments.

FIG. 7 is a flow chart of illustrative process 700 for determining there is a conflict between a first statement by a first user and a second statement by a second user, in accordance with some disclosed methods and embodiments. It should be noted that process 700 or any step thereof could be performed on, or provided by, any device shown in FIG. 3 and can incorporate various user interfaces (e.g., display of FIG. 3). For example, process 700 may be executed by control circuitry 308 (FIG. 3) of user equipment exemplified by computing device 300. In addition, one or more steps of process 700 may be incorporated into or combined with one or more steps of any other process or embodiment (e.g., starting at process block 802 in process 800 of FIG. 8, starting at process block 902 in process 900 of FIG. 9, starting at process block 1002 in process 1000 of FIG. 10). In addition, FIG. 1 and FIG. 2 provide depictions of exemplary embodiments of the processes described herein.

At 702, the application may detect a plurality of users making statements. In some embodiments, the application may accomplish the detection of users making statements by receiving audio data represented by user input 332 through a microphone that is continuously monitoring for inputs from a user via input/output circuitry 312, as shown in FIG. 3. At 704, the application may generate a respective audio signature for each respective user making statements. In some embodiments, the application is capable of recognizing different speech patterns based on pace of speaking, tone of voice, accent, or other recognized patterns and may be capable of differentiating between different inputs provided to input/output circuitry 312. The application may accordingly generate an audio signature, under which future statements with like audio patterns are stored and analyzed, when the application recognizes statements generated by a user that repeat the same patterns of speech. At 706, the application may assign a respective audio signature to each respective user making statements. At 708, the application may review if any statements made are responses. The application may use any of the slot-filling techniques shown in FIGS. 4-6 to determine that statements may be related and may be responses. At 710, if the application determines a first user is talking to a second user, the application proceeds to 712 where respective audio statements are converted to a string of characters for analysis. In some embodiments, the determination may be accomplished utilizing the slot-filling technique depicted in FIGS. 4-6, wherein the application may first identify domain 402 and may associate future statements with domain 402, and iterations of slot matrix 404 depicted by slot matrix 502 from FIG. 5 and slot matrix 602 from FIG. 6, when a second domain that is different from domain 402 is not identified in subsequent statements. At 710, if the application does not determine a first user is talking to a second user, the application continues to review if any statements are responses to first statements at 708. In some embodiments, the determination utilizing the slot-filling technique depicted in FIGS. 4-6, wherein the application may first identify domain 402 and determines that a second domain that is different from domain 402 is identified in subsequent statements.

At 714, the application determines a first subject of the first statement. In some embodiments, the application may determine the first subject of the first statement utilizing any known method of converting received speech to text for one skilled in the art. The application may parse the converted statement in the text form to identify nouns, verbs, and other components of a text string. The application may associate sections of the parsed statement with subjects from the domain identified utilizing the processes depicted in FIGS. 4-6. At 716, the application determines a first type of the first subject. At 718, the application determines a second subject of the second statement. At 720, the application determines a second type of the second subject. The application may use any of the slot-filling techniques shown in FIGS. 4-6 to determine respective types of respective subjects from each processed statement. At 722, if the application determines that the first type of the first subject of the first statement is the same as the second type of the second subject of the second statement, the application proceeds to 724. At 722, if the application determines that the first type of the first subject of the first statement is not the same as the second type of the second subject of the second statement, the application proceeds to 708 and continues to review if any statements made are responses to first statements.

At 724, if the application determines there is a conflict between the first statement and the second statement, the application generates a notification to users at 726 that a search may be conducted to resolve the conflict. The application may use any of the slot filling techniques shown in FIGS. 4-6 to determine there is a conflict between the first and second statements. At 724, if the application determines there is not a conflict between the first statement and the second statement, the application proceeds to 708 and continues to review if any statements made are responses to first statements.

Figure 8:
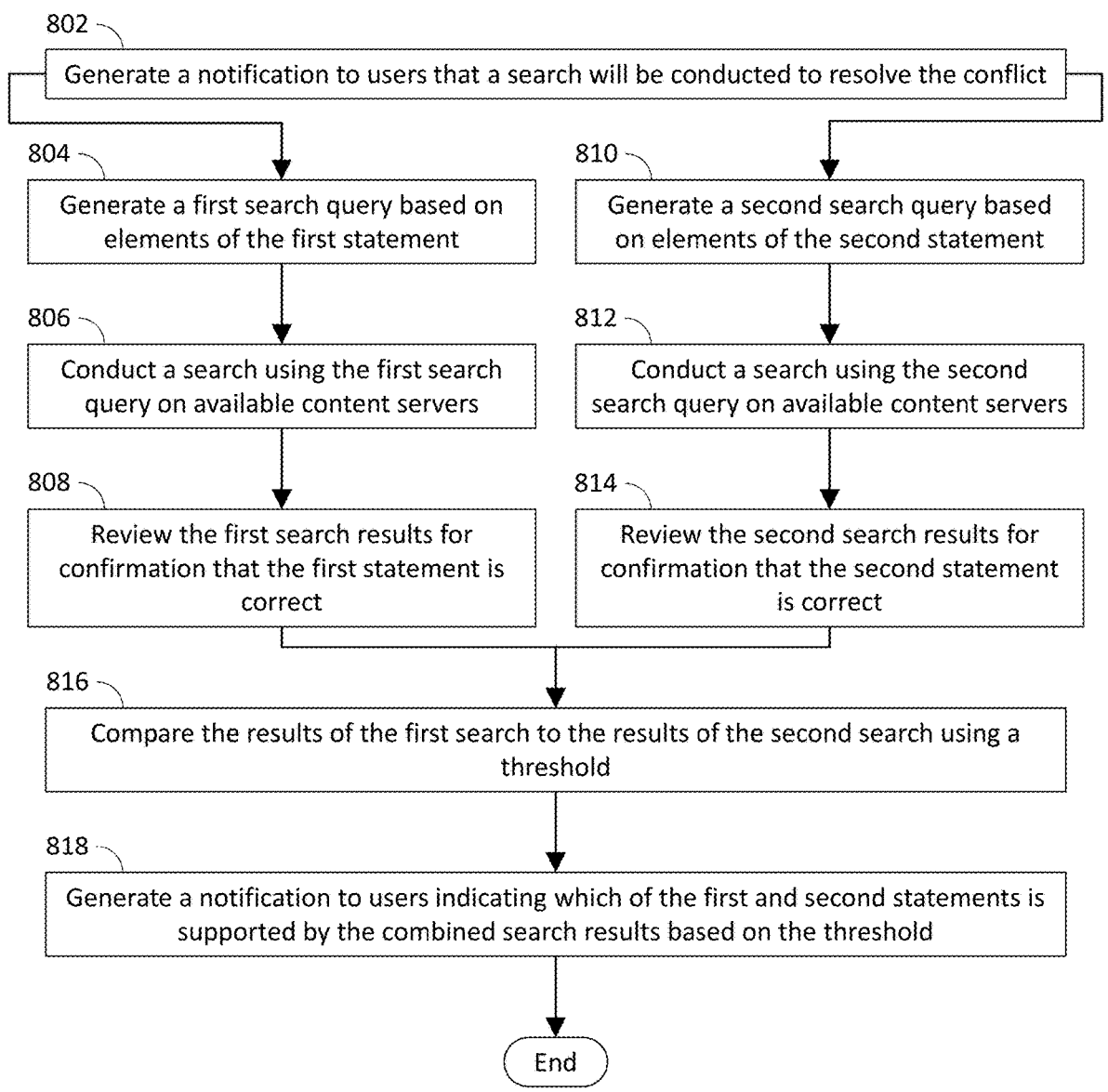
FIG. 8 is a flow chart representing an illustrative process for generating a notification to users of the results of a search, in accordance with some disclosed methods and embodiments.

FIG. 8 is a flow chart of illustrative process 800 for generating a notification to users of the results of a search, in accordance with some disclosed methods and embodiments. It should be noted that process 800 or any step thereof could be performed on, or provided by, any device shown in FIG. 3 and can incorporate various user interfaces (e.g., display of FIG. 3). For example, process 800 may be executed by control circuitry 308 (FIG. 3) of user equipment 302. In addition, one or more steps of process 800 may be incorporated into or combined with one or more steps of any other process or embodiment (e.g., starting at process block 726 in process 700 of FIG. 7, starting at process block 922 or 924 in process 900 of FIG. 9, starting at process block 1002 in process 1000 of FIG. 10). In addition, FIG. 1 and FIG. 2 provide depictions of exemplary embodiments of the processes described herein.

At 802, the application may generate a notification to users that a search may be conducted to resolve a conflict detected between two user statements. At 804, the application may generate a first search query based on elements of the first statement. In some embodiments, this may be accomplished by utilizing HuggingFace's Transformers library of algorithms, as previously described in this disclosure. It should be noted that the question generation may be accomplished by any other technique available to one skilled in the art. At 806, the application may detect available content servers and may conduct a search on each respective available content server using the first search query. At 808, the application may review the first search results for a confirmation of the first statement being correct.

At 810, the application may generate a second search query based on elements of the first statement. In some embodiments, this may be accomplished by utilizing HuggingFace's Transformers library of algorithms, as previously described in this disclosure. At 812, the application may detect available content servers and may conduct a search on each respective available content server using the first search query. At 814, the application may review the first search results for a confirmation of the first statement being correct.

At 816, the application may compare the results of the first search to the results of the second search using a threshold. The amount of support for a particular statement may be based on a threshold. For example, one statement may be supported by at least one more search result than the other statement. Alternatively, or additionally, a period of time may be measured between each search result and the time at which the statement was spoken. The threshold may then be based on how recently a search result was created based on a time stamp associated with the search result. The statement having search results with the most recent time stamps may then be considered as the statement with the most support. As another example, on the threshold may be related to the popularity of each search result, whether in a single database or in a plurality of databases, based on information related to the number of times each search result was selected by users on the platform on which the search was conducted. The threshold may also be based on the number of platforms accessible through a wireless network, based on a user profile associated with an audio signature, having search results that collectively support one statement over the other. For example, at least one more platform may have search results supporting the first statement over the second statement. It will be readily understood by a person skilled in the art that the threshold utilized herein may be any other suitable threshold, including any combination of the thresholds described herein, and may be determined based on which platforms a user profile associated with an audio signature has access to through the user equipment.

At 818, the application may generate a notification to the users that may comprise a statement indicating which of the user statements is correct, and may include an audio notification and access to content that confirms the content of the notification is correct.

Figure 9:
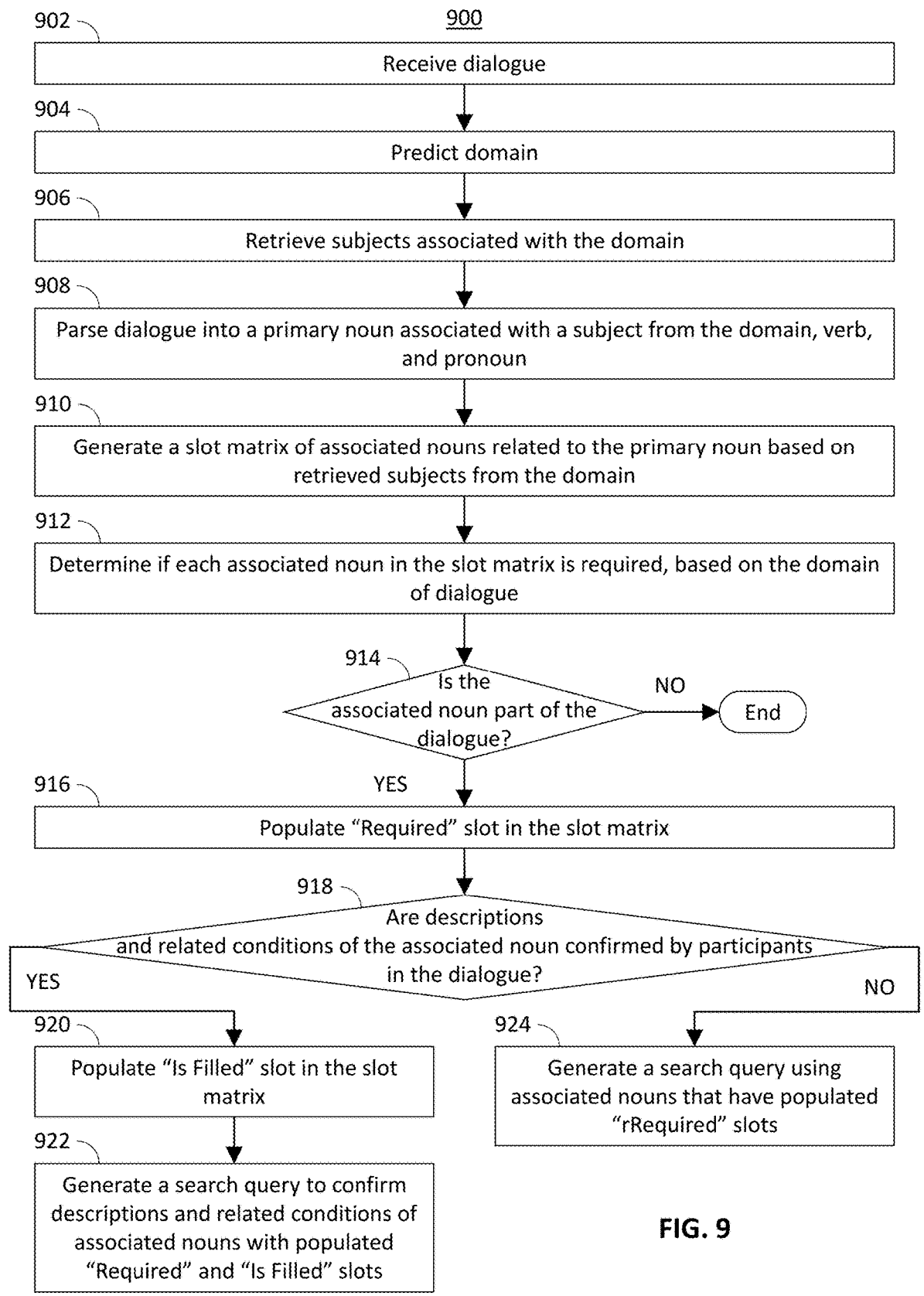
FIG. 9 is a flow chart representing an illustrative process for generating a search query based on a statement made by a user, in accordance with some disclosed methods and embodiments.

FIG. 9 is a flow chart of illustrative process 900 for generating a search query based on a statement made by a user, in accordance with some disclosed methods and embodiments. It should be noted that process 900 or any step thereof could be performed on, or provided by, any device shown in FIG. 3 and can incorporate various user interfaces (e.g., display of FIG. 3). For example, process 900 may be executed by control circuitry 308 (FIG. 3) of user equipment exemplified by computing device 300. In addition, one or more steps of process 900 may be incorporated into or combined with one or more steps of any other process or embodiment (e.g., starting at process block 712 in process 700 of FIG. 7, starting at process block 802 in process 800 of FIG. 8, starting at process block 1002 in process 1000 of FIG. 10). In addition, FIG. 1 and FIG. 2 provide depictions of exemplary embodiments of the processes described herein.

At 902, the application may receive dialogue from users, which comprises a plurality of user statements. At 904, the application may predict the domain of the conversation. The application may utilize an intent analyzer to predict the domain of the conversation. At 906, the application may retrieve subjects associated with the domain. At 908, the application may parse the dialogue utilizing speech-to-text processing encoded in the application, in accordance with some embodiments of the disclosure, to determine a primary noun, verb, and pronoun that is associated with the predicted domain. At 910, the application may generate a slot matrix, like the slot matrixes shown in FIGS. 4-6, comprised of the primary noun and other elements of the parsed dialogue. At 912, the application may determine if each associated noun in the slot matrix is required based on the domain of the dialogue. The application may track if a noun from a statement is required utilizing the slot matrixes depicted in FIGS. 4-6. If the application determines the associated noun is part of the dialogue at 914, the application may populate the "Required" slot in the slot matrix. If the application determines the associated noun is not part of the dialogue at 914, the application may terminate further analysis of the statement.

If the application determines statements made in the dialogue confirm descriptions and related conditions of the associated noun at 918, the application may populate the "Is Filled" slot in the slot matrix. At 922, the application may generate a search query to confirm descriptions and related conditions of the associated noun with populated "Required" and "Is Filled" slots to affirm that the participants in the dialogue have come to a correct conclusion. If the application determines statements made in the dialogue do not confirm descriptions and related conditions of the associated noun at 918, the application may generate a search query using associated nous that have populated "Required" slots at 924 and may utilize the intent analyzer to generate the search query to confirm descriptions and related conditions of the associated nouns with populated "Required" slots.

Figure 10:
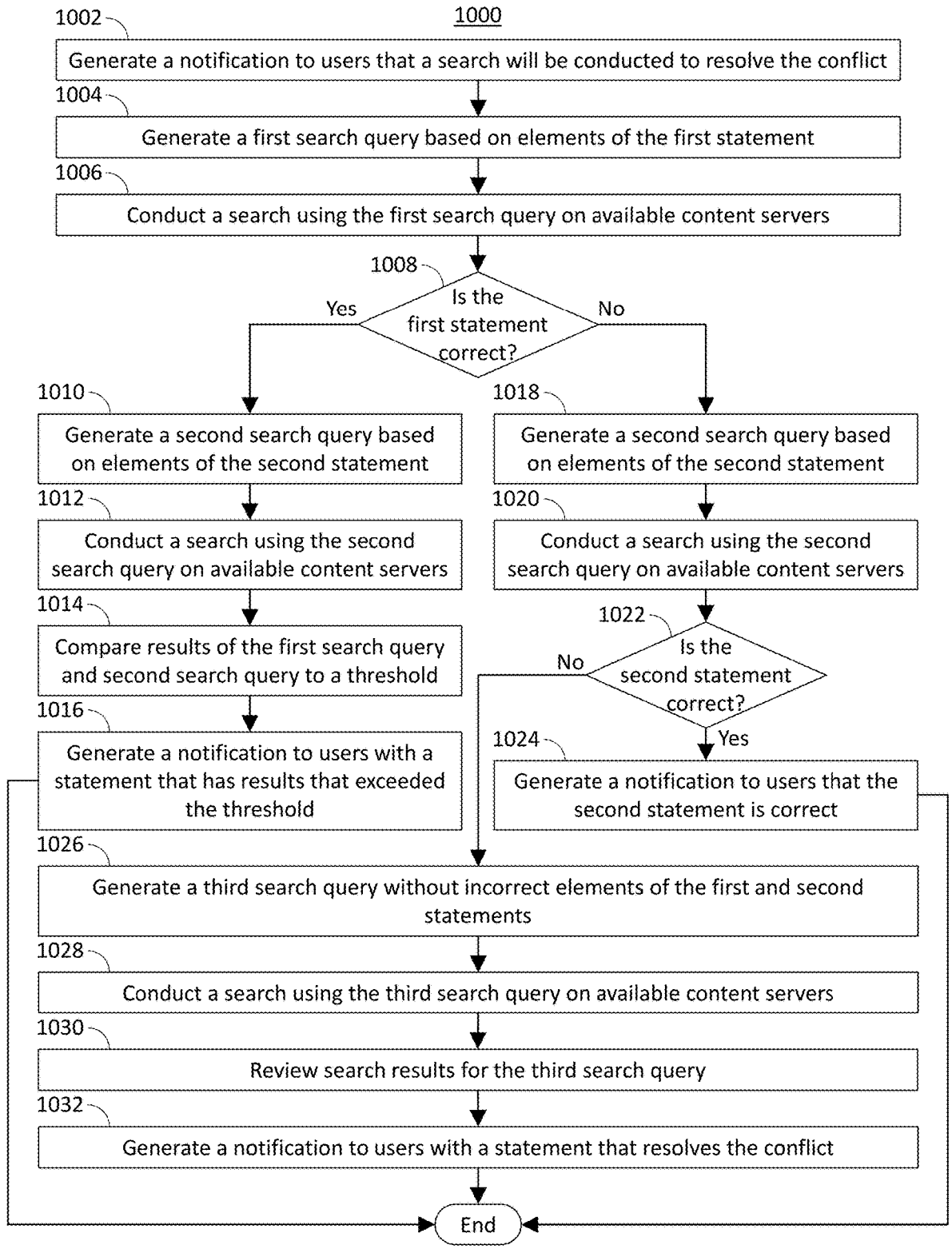
FIG. 10 is a flow chart representing an illustrative process for generating search queries and generating notifications to users based on statements made by users and the results of preliminary search queries, in accordance with some disclosed methods and embodiments.

FIG. 10 is a flow chart of illustrative process 1000 for generating search queries and generating notifications to users based on statements made by users and the results of preliminary search queries, in accordance with some disclosed methods and embodiments. It should be noted that process 1000 or any step thereof could be performed on, or provided by, any device shown in FIG. 3 and can incorporate various user interfaces (e.g., display of FIG. 3). For example, process 1000 may be executed by control circuitry 308 (FIG. 3) of user equipment exemplified by computing device 300. In addition, one or more steps of process 1000 may be incorporated into or combined with one or more steps of any other process or embodiment (e.g., starting at process block 712 in process 700 of FIG. 7, starting at process block 802 in process 800 of FIG. 8, starting at process block 902 in process 900 of FIG. 9). In addition, FIG. 1 and FIG. 2 provide depictions of exemplary embodiments of the processes described herein.

At 1002, the application may generate a notification to users that a search will be conducted to resolve the conflict detected between statements made in a conversation between users. At 1004, the application may generate a first search query based on elements of the first statement. The first search query may be generated utilizing the slot matrixes depicted in FIGS. 4-6. At 1006, the application may detect available content servers accessible by the user equipment system and may conduct a search using the generated search query on each respective server. If the application determines, based on the results of the first search query, that the first statement analyzed is correct at 1008, the application may generate a second search query based on elements of the second statement at 1010. At 1012, the application may detect available content servers accessible by the user equipment system and may conduct a second search using the generated second search query on each respective server.

At 1014, the application compares the results of the first search query and the results of the second search query to a threshold to determine if either set of search results exceed the threshold. The amount of support for a particular statement may be based on a threshold. For example, one statement may be supported by at least one more search result than the other statement. Alternatively, or additionally, a period of time may be measured between each search result and the time at which the statement was spoken. The threshold may then be based on how recently a search result was created based on a time stamp associated with the search result. The statement having search results with the most recent time stamps may then be considered as the statement with the most support. As another example, the threshold may be related to the popularity of each search result, whether in a single database or in a plurality of databases, based on information related to the number of times each search result was selected by users on the platform on which the search was conducted. The threshold may also be based on the number of platforms accessible through a wireless network, based on a user profile associated with an audio signature, having search results that collectively support one statement over the other. For example, at least one more platform may have search results supporting the first statement over the second statement. It will be readily understood by a person skilled in the art that the threshold utilized herein may be any other suitable threshold, including any combination of the thresholds described herein, and may be determined based on which platforms a user profile associated with an audio signature has access to through the user equipment.

At 1016, the application may generate a notification to users that may comprise a statement indicating which of the user statements is correct based on a comparison to the threshold, and may include an audio notification and access to content that confirms the content of the notification is correct.

If the application determines, based on the results of the first search query, that the first statement analyzed is not correct at 1008, the application may generate a second search query based on elements of the second statement at 1018. At 1020, the application may detect available content servers accessible by the user equipment system and may conduct a second search using the generated second search query on each respective server. If the application determines, based on the results of the second search query, that the statement analyzed is correct at 1022, the application may generate a notification to users that may comprise a statement indicating the second statement is correct, and may include an audio notification and access to content that confirms the content of the notification is correct at 1024.

If the application determines, based on the results of the second search query, that the statement analyzed is not correct at 1022, the application may proceed to generate a third search query at 1026 that does not include the incorrect elements of the first and second statements. At 1028, the application may detect available content servers accessible by the user equipment system and may conduct a third search using the generated second search query on each respective server. At 1030, the application may review results of the third search query. At 1032, the application may generate a notification to users that may comprise a statement that resolves the conflict between the first and second statements and may include an audio notification and access to content that confirms the content of the notification is correct.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

While some portions of this disclosure may refer to "convention" or examples, any such reference is merely to provide context to the instant disclosure and does not form any admission as to what constitutes the state of the art.

What is claimed is:

1. A method for identifying and resolving conflicts in a conversation, the method comprising:
    monitoring a conversation generated by a plurality of users, a first user of the plurality of users having a first audio signature and a second user of the plurality of users having a second audio signature;
    determining that a first statement is associated with the first audio signature;
    determining that a second statement is associated with the second audio signature;
    determining a first plurality of elements in the first statement and a first subject in the first statement from among the first plurality of elements;
    identifying a first type of the first subject;
    generating a first slot matrix of the first plurality of elements based on the first type;
    determining a second plurality of elements in the second statement and a second subject in the second statement from among the second plurality of elements;
    identifying a second type of the second subject;
    determining that the second type of the second subject is the same as the first type of the first subject;
    in response to determining that the second type of the second subject is the same as the first type of the first subject:
        determining present and required elements of the second statement based on the first plurality of elements;
        generating a second slot matrix of the second plurality of elements based on the first type;
        generating, based on the first statement, the first slot matrix, the second statement, and the second slot matrix, a comparison matrix to compare the first statement with the second statement; and
        determining, based on the comparison matrix, that information in the first statement conflicts with information in the second statement;
    in response to determining that information in the first statement conflicts with information in the second statement, generating a notification of the conflict;
    wherein the method comprises:
        conducting a first search based on the first statement;
        receiving, in response to the first search, a first plurality of content items related to the first statement;
        conducting a second search based on the second statement;
        receiving, in response to the second search, a second plurality of content items related to the second statement;
        comparing the first plurality of content and the second plurality of content, wherein the comparing comprises:
            determining if the first plurality of content supports the first statement or the second statement;
            determining if the second plurality of content items supports the first statement or the second statement; and
            generating a result notification, wherein the result notification identifies the first statement or the second statement as a statement supported by the first search and the second search.

2. The method of claim 1, wherein monitoring a conversation generated by a plurality of users comprises:
    detecting, by a microphone, a first user speaking; and
    detecting, by the microphone, a second user speaking.

3. The method of claim 1, wherein determining a first subject from among the first plurality of elements in the first statement comprises:
    receiving, by a microphone, the first statement;
    converting the first statement to a string of characters; and
    processing the string of characters to identify the first subject, wherein the first subject comprises a noun and a verb.

4. The method of claim 1, wherein determining a second subject from among the second plurality of elements in the second statement comprises:
    receiving, by a microphone, the second statement;
    converting the first statement to a string of characters; and
    processing the string of characters to identify the second subject, wherein the second subject comprises a noun and a verb.

5. The method of claim 1, further comprising:
    generating a respective audio signature for each of the respective users of the plurality of users; and
    assigning the respective audio signature of each user to its respective user.

6. The method of claim 1, wherein the notification of the conflict comprises an indication that the first statement is associated with the first user and that the first statement conflicts with the second statement associated with the second user.

7. The method of claim 1, wherein the first search is further conducted based on a previous search conducted by a first user.

8. The method of claim 1, wherein the first search is further conducted based on a previous search conducted by a second user.

9. A system for identifying and resolving conflicts in a conversation, the system comprising:
input/output circuitry configured to:
monitor a conversation generated by a plurality of users, a first user of the plurality of users having a first audio signature and a second user of the plurality of users having a second audio signature;
control circuitry configured to:
determine that a first statement, received from the input/output circuitry, is associated with the first audio signature;
determine that a second statement, received from the input/output circuitry, is associated with the second audio signature;
determine a first plurality of elements in the first statement and a first subject in the first statement from among the first plurality of elements;
identify a first type of the first subject;
generate a first slot matrix of the first plurality of elements based on the first type;
determine a second plurality of elements in the second statement and a second subject in the second statement from among the second plurality of elements;
identify a second type of the second subject;
determine that the second type of the second subject is the same as the first type of the first subject;
in response to determining the second type of the second subject is the same as the first type of the first subject:
determine present and required elements of the second statement based on the first plurality of elements;
generate a second slot matrix of the second plurality of elements based on the first type;
generate, based on the first statement, the first slot matrix, the second statement, and the second slot matrix, a comparison matrix to compare the first statement with the second statement;
determine, based on the comparison matrix, that information in the first statement conflicts with information in the second statement;
in response to determining that information in the first statement conflicts with information in the second statement, generate a notification of the conflict;
wherein the system is configured to:
conduct a first search based on the first statement; and
receive, in response to the first search, a first plurality of content related to the first statement;
conduct a second search based on the second statement;
receive, in response to the second search, a second plurality of content related to the second statement;
compare the first plurality of content and the second plurality of content, wherein the comparing comprises:
determining if the first plurality of content supports the first statement or the second statement; and
determining if the second plurality of content supports the first statement or the second statement; and
generate a result notification, wherein the result notification identifies the first statement or the second statement as a statement supported by the first search and the second search.

10. The system of claim 9, wherein the input/output circuitry is further configured to:
detect, by a microphone, a first user speaking; and
detect, by the microphone, a second user speaking.

11. The system of claim 9, wherein the control circuitry is further configured to determine a first subject from among the first plurality of elements in the first statement by:
receiving, by a microphone, the first statement;
converting the first statement to a string of characters; and
processing the string of characters to identify the first subject, wherein the first subject comprises a noun and a verb.

12. The system of claim 9, wherein the control circuitry is further configured to determine a second subject from among the second plurality of elements in the second statement by:
receiving, by a microphone, the second statement;
converting the first statement to a string of characters; and
processing the string of characters to identify the second subject, wherein the second subject comprises a noun and a verb.

13. The system of claim 9, wherein the control circuitry is further configured to:
generate a respective audio signature for each of the respective users of the plurality of users; and
assign the respective audio signature of each user to its respective user.

14. The system of claim 9, wherein the control circuitry is further configured to conduct the first search based on a previous search conducted by a first user.

15. The system of claim 9, wherein the control circuitry is further configured to conduct the first search based on a previous search conducted by a second user.

* * * * *